April 4, 1950  S. C. RIEKE  2,502,592
METHOD OF PRODUCING AND USING FRUIT
AND VEGETABLE COATING WAX
Filed April 30, 1942

INVENTOR.
SIDNEY C. RIEKE
BY Lester B. Clarke,
ATTORNEY

Patented Apr. 4, 1950

2,502,592

UNITED STATES PATENT OFFICE 2,502,592

METHOD OF PRODUCING AND USING FRUIT AND VEGETABLE COATING WAX

Sidney C. Rieke, Mission, Tex.

Application April 30, 1942, Serial No. 441,231

2 Claims. (Cl. 99—168)

The invention relates to a waxy composition and the method of forming the material in cakes so that it may be applied to fruit, vegetables and the like.

In my prior co-pending application, Serial No. 287,813, for Fruit and vegetable waxers, filed August 1, 1939, which has matured into Patent No. 2,372,225, issued March 27, 1945, there is disclosed and claimed a machine which finely pulverizes a waxy material and feeds it directly to the articles being coated. The wax is provided for the machine in cake form which must be of such consistency that the wax will brush from the cake in finely divided particles. These particles float down onto the articles being coated and are brushed or spread over the surface. An improved form of waxing machine is also shown in my copending application Serial No. 467,003, filed November 26, 1942, now Patent No. 2,341,369 for a Waxing machine.

It is an object of the invention to provide a cake of wax to be used in the coating operations described in my above quoted patent where the center of the cake is a relatively soft unstable wax which could not be formed, handled, or used in cake form, but such cake is made in stable form by enclosing the soft unstable wax in a coating or sheath of relatively harder, stable wax.

Other and further objects of the invention will be readily apparent when the following description is considered in connection with the accompanying drawing, wherein.

I have found that different fruits and different vegetables are best coated with somewhat different compositions of wax. Thus a harder firmer wax composition may be applied to citrus fruit because of the nature of the skin or hull thereof while a quite different wax composition is best suited for vegetables such as tomatoes and peppers. If a hard wax is used on the tomato I have found that the wax will not adhere to the smooth skin of the tomato and that a softer wax must be used. The question of polish must also be considered so that the articles will have the proper appearance. A softer wax may not be suitable for use in cake form at summer temperatures and I have found that the cake of soft wax may double up in the machine or otherwise become deformed and unmanageable or unserviceable. To overcome these disadvantages I have devised a method of preparing the cakes of wax so that the cakes can be readily formed, stored, handled and used. This method embodies the formation of a shell of harder wax to enclose a softer wax. Thus, the soft wax is confined and a suitable composition can be used in the waxing machines where such a cake is provided.

It is to be understood that the compositions hereinafter set out can be varied somewhat as to proportions depending on particular circumstances and conditions encountered such as temperatures, humidity, condition of the fruit and the time interval between coating and the marketing.

In order to illustrate one form of a suitable composition of relatively hard wax, it may be stated that a commercial form of paraffin wax having a melting point from 135° F., to 140° F. may be used as a base. To this paraffin is added an amount of either ordinary bees wax or a commercial form of carnauba wax, or if desired, some of each may be used. These materials are proportioned at about 94% to 98% paraffin and 2% to 6% of the other materials.

One form of softer wax may be illustrated as made up of approximately 75% paraffin having a melting point from 125° F. to 128° F. mixed with 16% to 25% of petroleum jelly and 2% to 5% of either bees wax or carnauba wax or a combination of the two latter. To 300 pounds of this is added two or three gallons of regular white gasoline or some suitable oily emulsifying agent.

The harder wax is preferable for citrus fruit while the softer wax is better for smooth skin fruit or vegetables.

As indicated above the softer wax is somewhat unstable under conditions often encountered during use and to permit of its efficient use the invention embodies the formation of the soft wax in cake form with a coating or shell of the harder wax.

Figure 1:
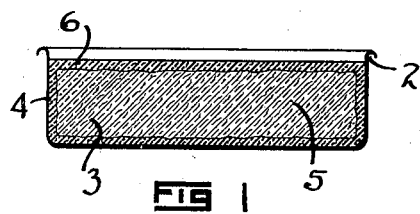
Fig. 1 is an illustration of a cake being formed in a pan where the pan has been filled with hard wax, the outside of which has already solidified and the center remains molten.
Figure 2:
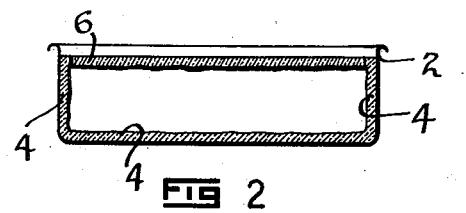
Fig. 2 is a sectional view where the top has been severed and then the molten center removed.

The cakes may be molded in small trays or pans 2 approximating six by ten inches and about 2½ inches in depth. The hard and the soft waxes are each compounded and then melted separately, the harder wax 3 is poured into the pans, as in Fig. 1, substantially filling the pans. This harder wax 3 will of course cool from the outside so that a solid shell 4 will form on the outside while the center 5 remains liquid. Before the center solidifies the top 6 of the shell is cut out, as in Fig. 2, and the molten center 5 poured out leaving a shell 4 in the bottom, sides and ends of the pan similar to a pie crust. The thickness of this shell 4 may be determined by the cooling permitted before the center is poured out and will be varied in accordance with the expected temperatures where the wax is to be used. In cooler temperatures only a one-eighth of an inch shell may be formed while for warmer or summer temperatures, as much as five-eighths of an inch in shell may be formed.

Figure 3:
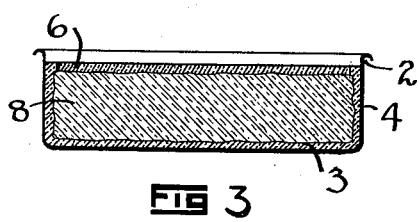
Fig. 3 is a sectional view where the relatively soft wax has been introduced to form the center portion in the shell of hard wax.
Figure 4:
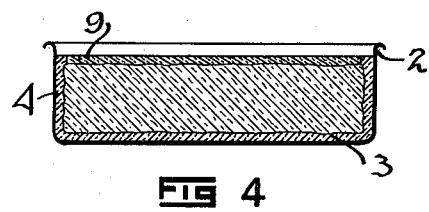
Fig. 4 illustrates a thin layer of hard wax having been applied to the soft wax center so as to completely enclose such center.
Figure 5:
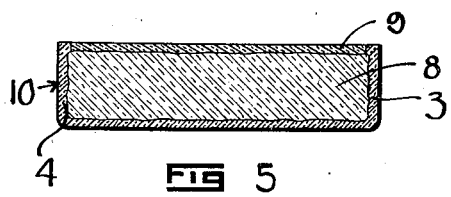
Fig. 5 illustrates a sectional view of the cake in finished form.

In either event, the softer wax 8 is now poured into the shell in the pans to approximately fill the shell, as in Fig. 3. The soft wax is allowed to cool so as to solidify in the shell of hard wax 9. A layer of the harder wax is now poured over the solidified soft wax to an amount such that it will contact the upstanding ends and edges of the shell of hard wax as in Fig. 4. When this top layer 9 of harder wax solidifies the softer wax is entirely enclosed to provide a cake 10 where the shell of harder wax completely supports and retains the softer wax. Fig. 5 shows the cake 10 removed from the pan or tray.

When a cake of wax formed as described is placed in the machine for use the hard shell maintains the softer wax in place and the feeder mechanism forces the hard shell toward the high speed cutting brushes so that the face of the cake in cross section is cut away to dust both the soft and hard wax onto the articles being waxed.

It has been shown in actual operation that waxes formulated as above provide excellent protection for the fruit and vegetables to prevent shrinkage and to permit transpiration or breathing.

Broadly the invention contemplates the formation of both hard and soft waxes and a cake of soft wax enclosed by a shell of the harder wax.

What is claimed is:

1. A method of using a soft normally unstable wax in coating fruit and vegetables wherein the wax is brushed from a cake in the form of small particles which comprises enclosing the soft unstable wax in a shell of relatively harder normally stable wax to provide a cake which can be handled, and brushing from such cake a shower made up of both soft wax and harder wax particles to fall by gravity to contact the articles being coated.

2. A method of forming cakes of wax for use in coating fruits and vegetables which comprises the steps of pouring a harder wax into the mold, allowing such wax to cool so that a shell is formed, severing the top portion of the shell and removing such top and the molten interior of the body, pouring a softer wax into the open shell, allowing the softer wax to solidify, pouring a layer of the harder wax on the softer wax to contact the edges of the shell so that the cake comprises a soft core and a harder shell.

SIDNEY C. RIEKE.

REFERENCES CITED

The following references are of record in the file of this patent:

UNITED STATES PATENTS

| Number | Name | Date |
| --- | --- | --- |
| 22,592 | Tatum | Jan. 11, 1859 |
| 1,450,408 | Brooks | Apr. 3, 1923 |
| 1,462,601 | Hohmann | July 24, 1923 |
| 1,726,304 | Lewis | Aug. 27, 1929 |
| 1,896,123 | Schweitzer | Feb. 7, 1933 |
| 1,970,861 | MacRill et al. | Aug. 21, 1934 |
| 2,058,584 | Gastel | Oct. 27, 1936 |
| 2,070,936 | Trowbridge | Feb. 16, 1937 |
| 2,118,521 | Pickens | May 24, 1938 |
| 2,150,284 | MacRill | Mar. 14, 1939 |
| 2,161,281 | Carter | June 6, 1939 |
| 2,186,691 | Belzer | Jan. 9, 1940 |
| 2,229,131 | Root | Jan. 21, 1941 |